(12) United States Patent
Olivier et al.

(10) Patent No.: US 10,600,163 B2
(45) Date of Patent: Mar. 24, 2020

(54) METHOD AND DEVICE FOR RECONSTRUCTING A DISPLAY ADAPTED HDR IMAGE

(71) Applicant: INTERDIGITAL VC HOLDINGS, INC., Wilmington, DE (US)

(72) Inventors: Yannick Olivier, Thorigné Fouillard (FR); David Touze, Rennes (FR); Nicolas Caramelli, Rennes (FR); Pierre Andrivon, Liffre (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/821,245

(22) Filed: Nov. 22, 2017

(65) Prior Publication Data
US 2019/0156468 A1    May 23, 2019

(51) Int. Cl.
G06T 5/00 (2006.01)
H04N 9/73 (2006.01)
G06T 5/20 (2006.01)

(52) U.S. Cl.
CPC ............... *G06T 5/009* (2013.01); *G06T 5/20* (2013.01); *G06T 2207/10024* (2013.01); *H04N 9/73* (2013.01)

(58) Field of Classification Search
None
See application file for complete search history.

(56) References Cited

U.S. PATENT DOCUMENTS

| | | | |
|---|---|---|---|
| 5,426,517 A * | 6/1995 | Schwartz | H04N 1/6027 358/520 |
| 9,685,139 B2 | 6/2017 | Miller et al. | |
| 10,148,907 B1 * | 12/2018 | Wu | G06T 5/007 |
| 2013/0162766 A1 * | 6/2013 | Cohen | H04N 13/271 348/43 |
| 2016/0381335 A1 | 12/2016 | Tao et al. | |
| 2017/0085833 A1 | 3/2017 | Toma et al. | |
| 2018/0350047 A1 * | 12/2018 | Baar | G06T 5/009 |

FOREIGN PATENT DOCUMENTS

| | | |
|---|---|---|
| EP | 3174280 | 5/2017 |
| WO | WO2017051612 | 3/2017 |
| WO | WO2017108906 | 6/2017 |

OTHER PUBLICATIONS

Lasserre et al ("Technicolor's response to CfE for HDR and WCG (Category 1)—Single layer HDR video coding with SDR backward compatibility", ISO/IEC JTC1/SC29/WG11 MPEG2014, No. M36263r1, Jun. 2015).*

* cited by examiner

*Primary Examiner* — Leon Viet Q Nguyen
(74) *Attorney, Agent, or Firm* — Lily Neff

(57) ABSTRACT

A method and device for reconstructing image data is provided that is representative of an original image data from a decoded image data and parameters obtained from a bitstream, the parameters having been processed from said original image data. The method provides a desaturating of a luma component, an inverse-mapping of desaturated luma component and a correction of chroma components. These operations are being modulated according to the value of a single modulation factor mod representative of a peak luminance of a presentation display on which the reconstructed image is intended to be displayed, a peak luminance of a particular range image and a peak luminance of the original image data or the mastering display used to grade the original image data.

25 Claims, 8 Drawing Sheets

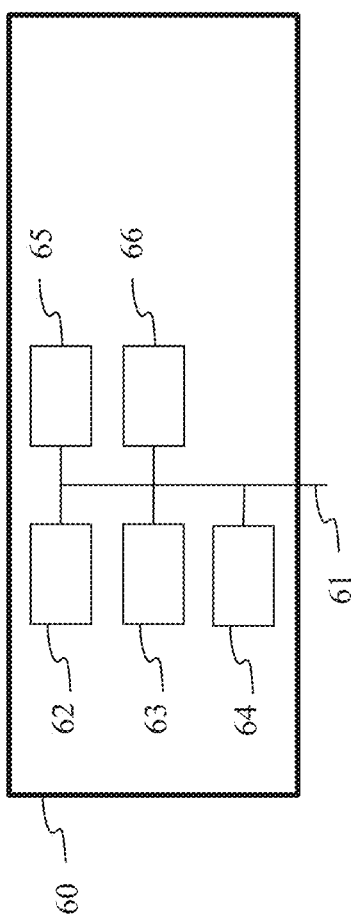

METHOD AND DEVICE FOR RECONSTRUCTING A DISPLAY ADAPTED HDR IMAGE

FIELD

The present principles generally relate to image/video reconstruction from decoded image/video data. Particularly, but not exclusively, the technical field of the present principles is related to the reconstruction of an image from another image, taking into account the image characteristics, reconstruction metadata and the presentation display capabilities.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, image data refer to one or several arrays of samples (pixel values) in a specific image/video format which specifies all information relative to the pixel values of an image (or a video) and all information which may be used by a display and/or any other device to visualize and/or decode an image (or video) for example. An image comprises a first component, in the shape of a first array of samples, usually representative of luminance (or luma) of the image, and a second and third component, in the shape of other arrays of samples, usually representative of the color (or chroma) of the image. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Standard-Dynamic-Range images (SDR images) are images whose luminance values are represented with a limited number of bits (typically 8). This limited representation does not allow correct rendering of small signal variations, in particular in dark and bright luminance ranges. In high-dynamic range images (HDR images), the signal representation is extended to maintain a high accuracy of the signal over its entire range. In HDR images, pixel values representing luminance levels are usually represented in floating-point format (typically at least 10 bits per component, namely float or half-float), the most popular format being openEXR half-float format (16-bit per RGB component, i.e. 48 bits per pixel) or in integers with a long representation, typically at least 16 bits.

The arrival of the High Efficiency Video Coding (HEVC) standard (*ITU-T H.265 Telecommunication standardization sector of ITU* (10/2014), *series H: audiovisual and multimedia systems, infrastructure of audiovisual services—coding of moving video, High efficiency video coding, Recommendation ITU-T H.265*) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21).

SDR backward compatibility with decoding and rendering devices is an important feature in some video distribution systems, such as broadcasting or multicasting systems.

A solution based on a single layer coding/decoding process may be backward compatible, e.g. SDR compatible, and may leverage legacy distribution networks and services already in place.

Such a single layer based distribution solution enables both high quality HDR rendering on HDR-enabled Consumer Electronic (CE) devices, while also offering high quality SDR rendering on SDR-enabled CE devices.

Such a single layer based distribution solution generates an encoded signal, e.g. SDR signal, and associated metadata (of a few bytes per video frame or scene) that can be used to reconstruct another signal, e.g. HDR signal, from a decoded signal, e.g. SDR signal.

Metadata stored parameters values used for the reconstruction of the signal and may be static or dynamic. Static metadata means metadata that remains the same for a video (set of images) and/or a program.

Static metadata are valid for the whole video content (scene, movie, clip . . . ) and may not depend on the image content. They may define, for example, image format or color space, color gamut. For instance, SMPTE ST 2086:2014, "Mastering Display Color Volume Metadata Supporting High Luminance and Wide Color Gamut Images" is such a kind of static metadata for use in production environment. The Mastering Display Colour Volume (MDCV) SEI (Supplemental Enhanced Information) message is the distribution flavor of ST 2086 for both H.264/AVC ("*Advanced video coding for generic audiovisual Services*", SERIES H: AUDIOVISUAL AND MULTIMEDIA SYSTEMS, Recommendation ITU-T H.264, Telecommunication Standardization Sector of ITU, January 2012) and HEVC video codecs.

Dynamic metadata are content-dependent, that is metadata can change with the image/video content, e.g. for each image or when each group of images. As an example, SMPTE ST 2094:2016 standards families, "Dynamic Metadata for Color Volume Transform" are dynamic metadata for use in production environment. SMPTE ST 2094-30 can be distributed along HEVC coded video stream thanks to the Colour Remapping Information (CRI) SEI message.

Other single layer based distribution solutions exist on distribution networks for which display adaptation dynamic metadata are delivered along with a legacy video signal. These single layer based distribution solutions may produce HDR 10-bits image data (e.g. image data which signal is represented as an HLG10 or PQ10 signal as specified in Rec. ITU-R BT.2100-0 "Recommendation ITU-R BT.2100-0, Image parameter values for high dynamic range television for use in production and international program exchange") and associated metadata from an input signal (typically 12 or 16 bits), encodes said HDR 10-bits image data using, for example an HEVC Main 10 profile encoding scheme, and reconstructs a video signal from a decoded video signal and said associated metadata. The dynamic range of the reconstructed signal being adapted according to the associated metadata that may depend on characteristics of a target display.

ETSI TS 103 433 V1.1.1 published in August 2016 proposes a single layer distribution solution that addresses direct backwards compatibility i.e. it leverages SDR distribution networks and services already in place and that enables high quality HDR rendering on HDR-enabled CE devices including high quality SDR rendering on SDR CE devices. Some elements of this specification are detailed below in the description of FIG. 2.

A display adaptation method has been proposed in this standard. This method aims at adapting a reconstructed HDR signal to a luminance level that corresponds to the display luminance capability. For example, a reconstructed HDR can be 1000 cd/m² (nits) while the display used to render the image can only render up to 500 nits. One objective of this display adaptation is to maintain the creative intent captured in the mapping between SDR and HDR as best as possible. It is using recalculated metadata values used in the tone mapping operations based on the ratios between the original HDR peak luminance, the targeted SDR peak luminance (fixed to 100 nits) and the presentation display maximum luminance. The Display Adaptation can run down to 100 nits, thus providing a SDR signal compatible with SDR displays. However, this prior art display adaptation method showed unsatisfying results when used on displays having low peak luminance: firstly, some color shifting appears on displays with low peak luminance and secondly, for displays having a peak luminance of 100 nits, the generated SDR images at the post-processor output are different than the SDR images at the post-processor input which is not acceptable since the post-processor should act as a pass-through.

It can therefore be appreciated that there is a need for a solution for the reconstruction of an HDR video so that the image is adapted to the display on which it will be rendered that addresses at least some of the problems of the prior art, particularly on displays with low peak luminance. The present disclosure provides such a solution.

SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method and device for reconstructing image data representative of an original image data from a decoded image data and parameters obtained from a bitstream, said parameters having been processed from said original image data, comprising a desaturating of a luma component, an inverse-mapping of desaturated luma component and a correction of chroma components, these operation being modulated according to the value of a single modulation factor mod representative of a peak luminance of a presentation display on which the reconstructed image is intended to be displayed, a peak luminance of a typical Standard-Dynamic-Range image and a peak luminance of the original image data or the mastering display used to grade the original image data.

Although the description uses the peak luminance characteristic, the principles are not restricted to peak luminance but apply to any other value characterizing a display, such as average or median luminance for example.

In a first aspect, the disclosure is directed to a method reconstructing image data ($I_3$) representative of original image data ($I_1$) from decoded image data ($I_2$) and parameters obtained from a bitstream, said parameters having been processed from said original image data ($I_1$), wherein the reconstructed image is adapted to a characteristic of a presentation display, the method comprising: correcting two chroma components to obtain two reconstructed chroma components according to said desaturated luma component and said reconstructed luma component; characterized in that the chroma correction is responsive to the value of a single modulation factor mod representative of: a luminance information data (D_PL) of the presentation display; a luminance information data (SDR_PL) of a typical Standard-Dynamic-Range image; and a luminance information data (C_PL) of the original image data ($I_1$) or the mastering display used to grade the original image data.

In a variant of first aspect, the value of the modulation factor is computed according to following formula:

$$\mathrm{mod} = 1 - \frac{invPQ(\mathrm{D\_PL}) - invPQ(\mathrm{SDR\_PL})}{invPQ(\mathrm{D\_PL}) - invPQ(\mathrm{SDR\_PL})}$$

wherein D_PL is a luminance information data of the presentation display, SDR_PL is a luminance information data of a typical Standard-Dynamic-Range image, C_PL is a luminance information data of the original image data ($I_1$) or the mastering display used to grade the original image data and invPQ is a inverse transfer function.

In a second variant of first aspect, the method further comprises: desaturating a luma component according to parameters for adjusting the desaturation; inverse-mapping said desaturated luma component to obtain a reconstructed luma component; and performing a compression correction; characterized in that the desaturating, the inverse-mapping, the compression correction and the chroma correction are responsive to the value of the single modulation factor mod. In a variant, the value of the modulation factor is computed according to following formula:

$$\mathrm{mod} = \frac{\mathrm{D\_PL} - \mathrm{SDR\_PL}}{\mathrm{C\_PL} - \mathrm{SDR\_PL}}$$

wherein D_PL is a luminance information data of the presentation display, SDR_PL is a luminance information data of a typical Standard-Dynamic-Range image; and C_PL is a luminance information data of the original image data ($I_1$) or the mastering display used to grade the original image data In variant embodiments of first aspect:
the value of SDR_PL is 100 nits.
the desaturating (120) operation further comprises obtaining (31) a desatured luma component $y'_1$ as follows:

$$y'_1 = y' + \mathrm{Max}(0, a \times \mathrm{mod} \times u' + b \times \mathrm{mod} \times v')$$

where a and b are two control parameters for adjusting the desaturation, y' is the luma component and u' v' are the chroma components.

the inverse-mapping (121) is using a look-up table constructed using a gamma function modulated by the modulation factor according to following formula:

$$\gamma = 2.0 + 0.4 \times (1 - \mathrm{mod})$$

the color correcting (122) operation uses a look-up table lutCC defining the correction to apply to the chroma components for a given luma component, the look-up table lutCC being derivated based on a saturation gain function sgf( ) whose impact is modulated by the modulation factor as follows:

lutCC(Y)=f(Y)·(1/Y) with f(Y)=1/(R·(sgf(1/Y)·mod+ (1−mod)/R)

with R being a constant value equal to 2.

the format adapting comprises a gamma function modulated by the modulation factor according to following formula:

γ=2.0+0.4×(1−mod)

the combined compression correction comprises: computing a parameter T based on parameters k0, k1, k2 obtained from a set of parameters SP, the parameter T being responsive to a value of the single modulation factor mod as follows: T=k0×U'×V'+k1×U'×U'+k2× V'×V' and when the parameter T is smaller than 1, computing the combined compression correction as follows: S=√(1−T), U=U', and V=V' and when the parameter T is greater than or equal to 1, computing the combined compression correction as follows: S=0, U=U'/√T, V=V'/√T In a second aspect, the disclosure is directed to a device for reconstructing image data ($I_3$) representative of original image data ($I_1$) from decoded image data ($I_2$) and parameters obtained from a bitstream, said parameters having been processed from said original image data ($I_1$), wherein the reconstructed image is adapted to a characteristic of a presentation display, the device comprising a processor configured to: correct two chroma components to obtain two reconstructed chroma components according to said desaturated luma component and said reconstructed luma component; characterized in that the chroma correction is responsive to the value of a single modulation factor mod representative of: a luminance information data of the presentation display; a luminance information data of a typical Standard-Dynamic-Range image; and a luminance information data of the original image data ($I_1$) or the mastering display used to grade the original image data.

In a variant of second aspect, the value of the modulation factor is computed according to following formula:

$$\text{mod} = 1 - \frac{invPQ(\text{D\_PL}) - invPQ(\text{SDR\_PL})}{invPQ(\text{D\_PL}) - invPQ(\text{SDR\_PL})}$$

wherein D_PL is a luminance information data of the presentation display, SDR_PL is a luminance information data of a typical Standard-Dynamic-Range image, C_PL is a luminance information data of the original image data ($I_1$) or the mastering display used to grade the original image data and invPQ is an inverse transfer function.

In a second variant of second aspect, the processor is further configured to: desaturate a luma component according to parameters for adjusting the desaturation; perform an inverse-mapping said desaturated luma component to obtain a reconstructed luma component; and perform a compression correction;

characterized in that the desaturating, the inverse-mapping, the compression correction and the chroma correction are responsive to the value of the single modulation factor mod.

In a variant embodiment of second aspect, the value of the modulation factor is computed according to following formula:

$$\text{mod} = \frac{\text{D\_PL} - \text{SDR\_PL}}{\text{C\_PL} - \text{SDR\_PL}}$$

wherein D_PL is a luminance information data of the presentation display, SDR_PL is a luminance information data of a typical Standard-Dynamic-Range image; and C_PL is a luminance information data of the original image data ($I_1$) or the mastering display used to grade the original image data In a third aspect, the disclosure is directed to a computer program product comprising program code instructions to execute the steps of the method according to one of the claims 1 to 8 when this program is executed on a computer.

In a fourth aspect, the disclosure is directed to a non-transitory processor-readable medium whose program code instructions to execute the steps of the method according to one of the claims 1 to 8 when this program is executed on a computer.

BRIEF DESCRIPTION OF DRAWINGS

In the drawings, examples of the present principles are illustrated. It shows:

FIG. 6 shows an example of an architecture of a device in accordance with an example of present principles;

Similar or same elements are referenced with the same reference numbers.

DESCRIPTION OF EXAMPLE OF THE PRESENT PRINCIPLES

Figure 1:
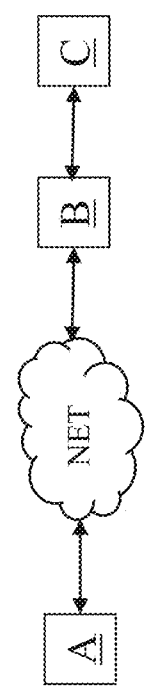
FIG. 1 shows a high-level representation of an end-to-end workflow supporting content delivery to displays with improved display adaptation feature in accordance with an example of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

In the following, the capital symbols, for example (C1, C2, C3), designate components of a first image, and lower-case symbols, for example (c1, c2, c3), designate components of another image whose dynamic range of the luminance is lower than the dynamic range of the luminance of the first image.

The dynamic range of the luminance of an image is the ratio between the maximum over the minimum of the luminance values of said image. Typically, the dynamic range of the luminance of a SDR image is 500 (100 cd/m2 over 0.2 cd/m2) and 10000 (1000 cd/m2 over 0.1 cd/m2) for an HDR image.

Prime symbols, in the following, for example $$(Y' = Y^{\frac{1}{\gamma}}, U' = U^{\frac{1}{\gamma}}, V' = V^{\frac{1}{\gamma}}),$$

designate gamma-compressed components of a first image when those prime symbols are capital symbols and prime symbols, for example (y',u',v'), designate gamma-compressed components of a second image when those prime symbols are lower-case symbols.

The present principles are described for coding/decoding/reconstructing an image but extends to the coding/decoding/reconstruction of a sequence of images (video) because each image of the sequence is sequentially encoded/decoded/reconstructed as described below.

FIG. 1 shows a high-level representation of an end-to-end workflow supporting content delivery to displays with improved display adaptation feature in accordance with an example of the present principles. The device A is configured to implement a method for encoding an image or a video stream, the device B is configured to implement a method for decoding an image or video stream as described below, and the device C is configured to display the decoded image or video stream. The two remote devices A and B are communicating over a distribution network NET that is configured at least to provide the encoded image or video stream from device A to device B.

Device A being configured to implement an encoding method belongs to a set comprising a mobile device, a communication device, a game device, a tablet (or tablet computer), a computer device such as a laptop, a still image camera, a video camera, an encoding chip, a still image server and a video server (e.g. a broadcast server, a video-on-demand server or a web server).

Device B being configured to implement a decoding method as described herein belongs to a set comprising a mobile device, a communication device, a game device, a computer device and a set top box.

Device C being configured to implement a displaying method as described herein belongs to a set comprising a TV set (or television), a tablet (or tablet computer), a computer device such as a laptop, a display, a head-mounted display and a decoding chip.

In accordance with an example, the network is a broadcast network, adapted to broadcast still images or video images from device A to a plurality of decoding devices including the device B. DVB and ATSC based networks are examples of such broadcast networks. In accordance with another example, the network is a broadband network adapted to deliver still images or video images from device A to a plurality of decoding devices including the device B. Internet-based networks, GSM networks or TV over IP networks are examples of such broadband networks.

In a preferred embodiment, device B obtains peak luminance capabilities of device C and peak luminance characteristics of the still images or video images to be displayed. Device B then combines this peak luminance information into a single value, hereafter named modulation factor and abbreviated mod. This single value is used to modulate a plurality of parameters used during the reconstruction of the still images or video images in order to correct the color shift and color mismatch of prior art display adaptation. Thus, the end-to-end workflow ensures that the still images or video images are optimally displayed according to the display capabilities and the content characteristics.

In the preferred embodiment, the end-to-end workflow uses a broadcast server for device A, a set top box for device B, a television for device C and a DVB terrestrial broadcast network. In an alternate embodiment, device B and C are combined in a single device, for example a television integrating set top box decoding functionalities.

In an alternate embodiment, the distribution network NET is replaced by a physical packaged media on which the encoded image or video stream is stored. Physical package media comprise optical packaged media such a Blu-ray disc and UHD Blu-ray but also memory-based package media.

Figure 2:
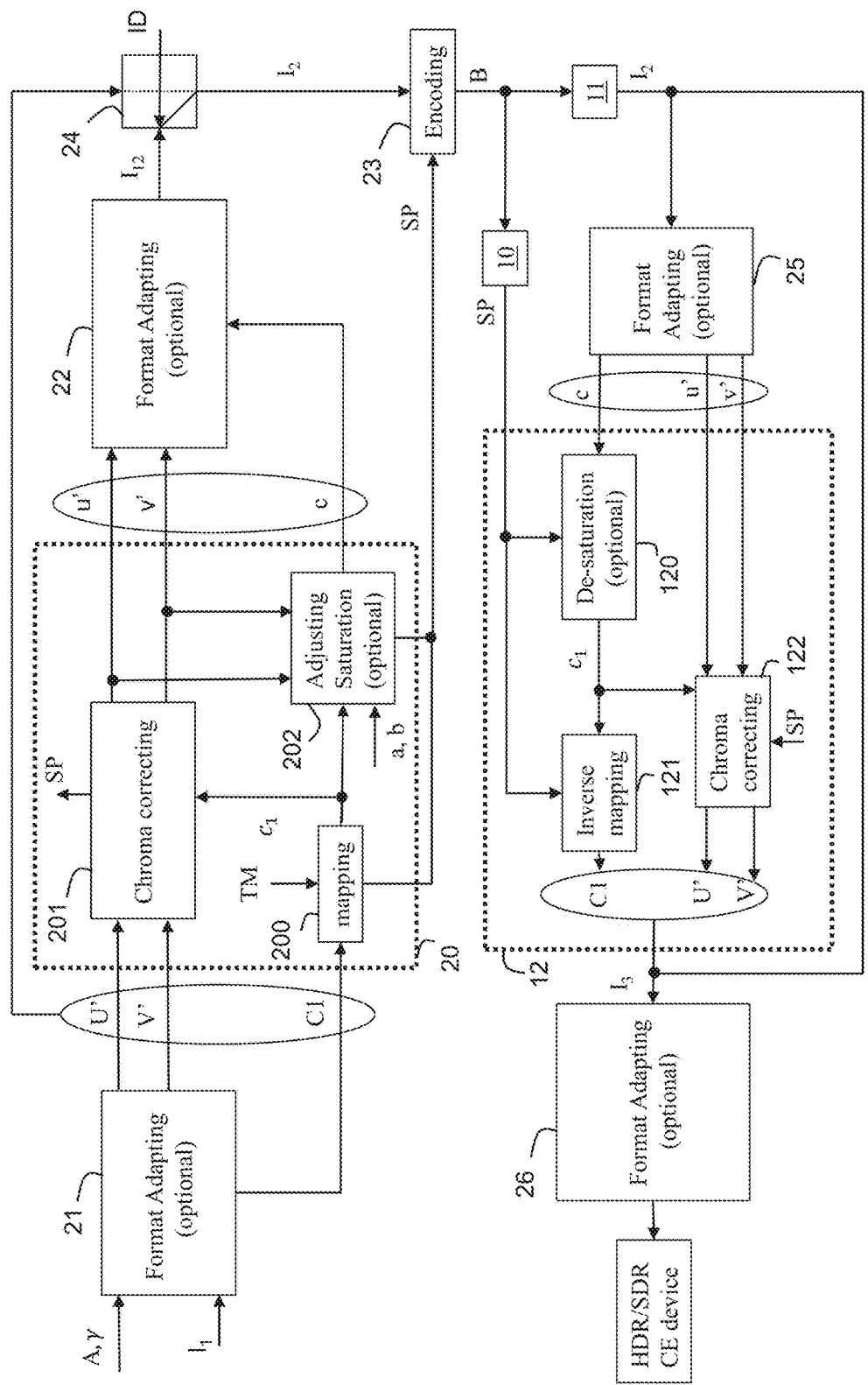
FIG. 2 shows an end-to-end workflow supporting content production and delivery to HDR and SDR CE displays in accordance with a prior art solution.

FIG. 2 shows an end-to-end workflow supporting content production and delivery to HDR and SDR CE displays in accordance with a prior art solution defined in ETSI recommendation TS 103 433 V1.1.1.

This workflow involves a single layer based distribution solution with associated metadata and illustrates an example of the use of a method for reconstructing an image $I_3$ representative of original image data $I_1$ from a decoded image data $I_2$ and a set of parameters SP.

Basically, this single layer based distribution solution comprises an encoding and a decoding part.

At the pre-processing part, a pre-processing stage 20 decomposes the original image $I_1$ in an output image $\hat{I}_2$ and a set of parameters SP, and a switching step 24 determines if either the original image $I_1$ or the output image $I_{12}$ is encoded in the bitstream B (step 23).

In step 23, the image $I_2$ may be encoded with any legacy video codec and the bitstream B is carried throughout an existing legacy distribution network with accompanying associated metadata (set of parameters SP) conveyed on a specific channel or embedded in the bitstream B.

In a variant, the bitstream B with accompanying metadata are stored on a storage medium such a Blu-ray disk or a disk of a Set-Top-Box for example.

In a variant, the accompanying associated metadata is carried by another specific channel or store on a separate storage medium.

Preferably, the video coded is an HEVC codec such as the H.265/HEVC codec (*ITU-T H.265 Telecommunication standardization sector of ITU* (10/2014), *series H: audiovisual and multimedia systems, infrastructure of audiovisual services—coding of moving video, High efficiency video coding, Recommendation ITU-T H.265*) or H.264/AVC ("*Advanced video coding for generic audiovisual Services*", SERIES H: AUDIOVISUAL AND MULTIMEDIA SYSTEMS, Recommendation ITU-T H.264, Telecommunication Standardization Sector of ITU, January 2012).

In the case the information data ID determines that the original image $I_1$ (possibly represented by the components (C1,U', V') or a Y'CbCr 4:2:0 PQ10 or HLG10 video signal) is encoded in step 23, said original image $I_1$ may be encoded with the HEVC Main 10 profile.

In the case the information data ID determines that the output image $I_{12}$ is encoded in step 23, the output image $I_{12}$, which can be represented as a Y'CbCr 4:2:0 gamma transfer characteristics (Standard Dynamic Range) signal may be encoded with any HEVC profile including Main 10 or Main profiles.

The information data ID may be also conveyed as associated metadata (step 23). At the post-processing part, a decoded image $\hat{I}_2$ is obtained from the bitstream B (step 11), a set of parameters SP is obtained as explained in FIG. 1 (step 10) and a post-processing stage 12, which is the functional inverse of the pre-processing stage 20, reconstructs an image $I_3$ from the decoded image $\hat{I}_2$ and the set of parameters SP.

This single layer based distribution solution may also comprise optional format adapting steps 21, 22, 25, 26.

For example, in step 21 (optional), the format of the original image $I_1$ may be adapted to a specific format (C1,U',V') of the input of the pre-processing stage 20, and in step 22 (optional), the format (c, u', v') of the output image $I_{12}$ may also be adapted to a specific output format before encoding. In step 25, the format of the decoded image $\hat{I}_2$ may be adapted to a specific format of the input of the post-processing stage 12, and in step 26, the image $I_3$ may be adapted to at least one characteristic of a targeted apparatus (e.g. a Set-Top-Box, a connected TV, HDR/SDR enabled CE device, a Blu-ray disc player) and/or an inverse gamut mapping may be used when the decoded image $\hat{I}_2$ and the image $I_3$ or the original image $I_1$ are represented in different color spaces and/or gamut.

Said format adaptation steps (21, 22, 25, 26) may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc. Note that the well-known YUV color space refers also to the well-known YCbCr in the prior art. ETSI recommendation TS 103 433 V1.1.1, release 2016-8, provides an example of format adapting processes and inverse gamut mapping (Annex D).

Said input format adaptation step 21 may also include adapting the bit depth of the original image $I_1$ to specific bit depth such as 10 bits for example, by applying a transfer function on the original image $I_1$. For example a PQ or HLG transfer function may be used (Rec. ITU-R BT.2100-0).

In more details, the pre-processing stage 20 comprises steps 200-202. In step 200, a first component c1 of the output image $I_{12}$ is obtained by mapping a first component C1 of the original image $I_1$:

$$c_1 = TM(C1)$$

with TM being a mapping function. The mapping function TM may reduce or increase the dynamic range of the luminance of the original image $I_1$ and its inverse may increase or reduce the dynamic range of the luminance of an image.

In step 201, a second and third component u', v' of the output image $I_{12}$ are derived by correcting second and third components U', V' of the original image $I_1$ according to the first component $c_1$.

The correction of the chroma components may be maintained under control by tuning the parameters of the mapping. The color saturation and hue are thus under control.

According to an embodiment of step 201, the second and third components U' and V' are divided by a scaling function $\beta_0(c_1)$ whose value depends on the first component $c_1$.

Mathematically speaking, the second and third components u', v' are given by:

$$\begin{bmatrix} u' \\ v' \end{bmatrix} = \frac{1}{\beta_0(c_1)} \cdot \begin{bmatrix} U' \\ V' \end{bmatrix}$$

Optionally, in step 202, the first component $c_1$ may be adjusted to further control the perceived saturation, as follows:

$$c = c_1 - \max(0, a \cdot u' + b \cdot v')$$

where a and b are two parameters of the set of parameters SP.

This step 202 allows to control the luminance of the output image $I_{12}$ to guarantee the perceived color matching between the colors of the output image $I_{12}$ and the colors of the original image $I_1$.

The set of parameters SP may comprise parameters relative to the mapping function TM or its inverse ITM, the scaling function $\beta_0(c_1)$. These parameters are associated with dynamic metadata and carried in a bitstream, for example the bitstream B. The parameters a and b may also be carried in a bitstream.

In more details, at the post-processing part, in step 10, a set of parameters SP is obtained.

According to an embodiment of step 10, the set of parameters SP are carried by static/dynamic metadata obtained from a specific channel or from a bitstream, including the bitstream B, possibly store on a storage medium.

In step 11, a decoded image $I_2$ is obtained by decoding the bitstream B and the decoded image $I_2$ is then available for either an SDR or HDR enabled CE display.

In more details, the post-processing stage 12 comprises steps 120-122. In optional step 120, the first component c of the decoded image $I_2$ may be adjusted as follows:

$$c_1 = c + \max(0, a \cdot u' + b \cdot v')$$

where a and b are two parameters of the set of parameters SP.

In step 121, the first component C1 of the image $I_3$ is obtained by inverse-mapping the first component $c_1$:

$$C_1 = ITM(c_1)$$

In step 122, the second and third component U', V' of the image $I_3$ are derived by inverse correcting the second and third components u', v' of the decoded image $I_2$ according to the component $c_1$.

According to an embodiment of step 122, a second and third components u' and v' are multiplied by a scaling function $\beta_0(c_1)$ whose value depends on the first component $c_1$.

Mathematically speaking, the two first and second components U', V' are given by:

$$\begin{bmatrix} U' \\ V' \end{bmatrix} = \beta_0(c_1) \cdot \begin{bmatrix} u' \\ v' \end{bmatrix}$$

The end-to-end workflow of FIG. 2 further provides a display adaptation function defined in annex E of recommendation ETSI TS 103 433 V1.1.1. It uses recalculated metadata values based on the ratios between the original HDR peak luminance, a targeted SDR peak luminance fixed to 100 cd/m2 and the presentation display maximum luminance. This display adaptation operates only in step 121. This display adaptation showed unsatisfying results, as mentioned in the background section.

Figure 3:
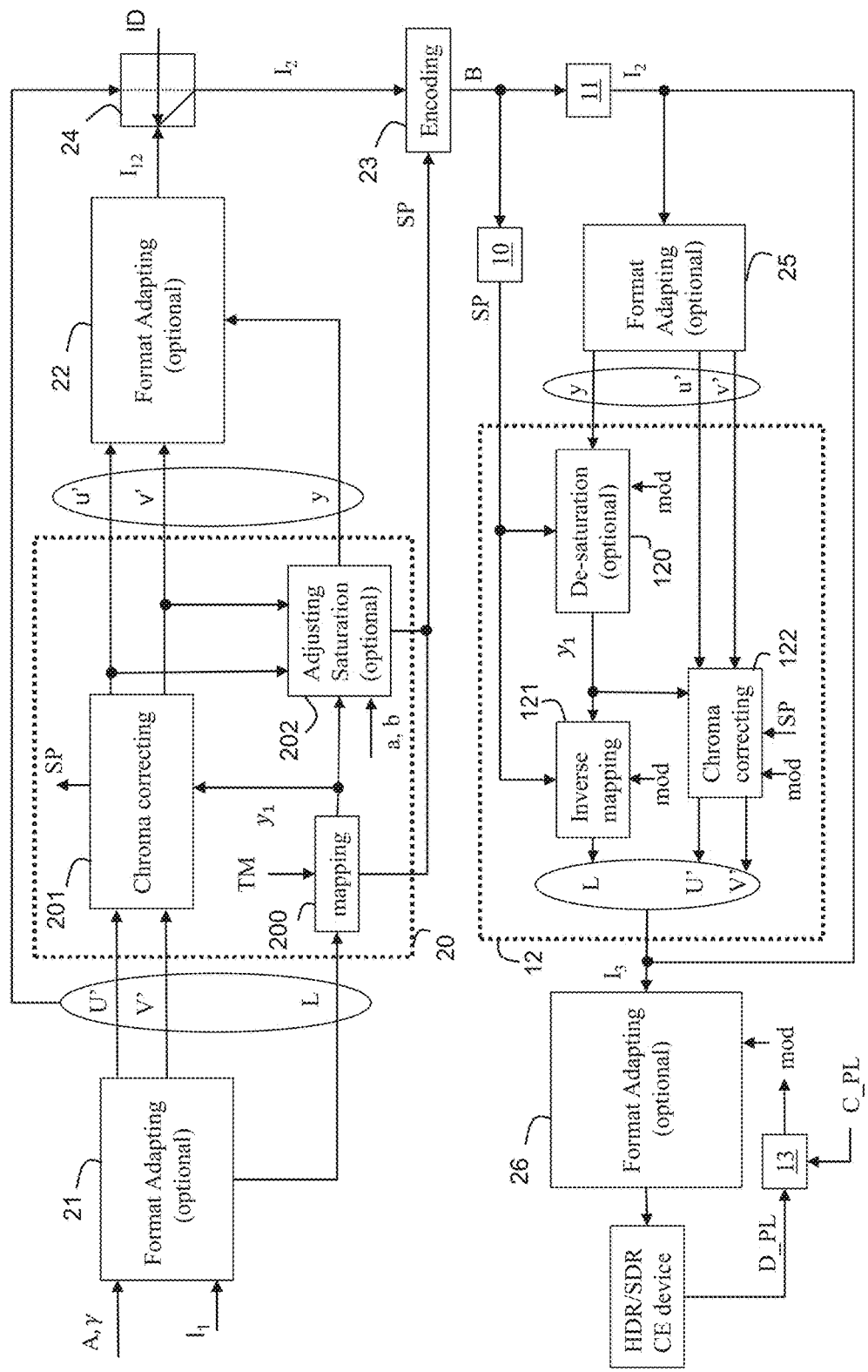
FIG. 3 shows an exemplary embodiment of an end-to-end workflow of FIG. 2 comprising an improved display adaptation function in accordance with an embodiment of the present principles.

According to a first exemplary embodiment of the method of FIG. 2 further comprising an improved display adaptation function, as illustrated in FIG. 3 at the pre-processing part, the first component C1 of the original image $I_1$ is a linear-light luminance component L obtained from the RGB component of the original image $I_1$ by:

$$C1 = L = A_1 \begin{bmatrix} R \\ G \\ B \end{bmatrix}$$

and the second and third component U', V' are derived by applying a pseudo-gammatization using square-root (close to BT.709 OETF) to the RGB components of the original image $I_1$:

$$\begin{bmatrix} U' \\ V' \end{bmatrix} = \begin{bmatrix} A_2 \\ A_3 \end{bmatrix} \begin{bmatrix} \sqrt{R} \\ \sqrt{G} \\ \sqrt{B} \end{bmatrix} \times 1024$$

In step 200, the first component $y_1$ of the output image $I_{12}$ is obtained by mapping said linear-light luminance component L:

$$y_1 = TM(L)$$

In step 201, the second and third component u', v' of the output image $I_{12}$ are derived by correcting the first and second components U', V' according to the first component $y_1$.

At the post-processing part, in step 13, the presentation display peak luminance (D_PL) parameter is obtained from the display device on which the output image is displayed. The content or mastering peak luminance (C_PL) parameters is obtained from the decoded image or from the set of parameters SP. These parameters are combined with a SDR presentation display peak luminance (SDR_PL), that typically corresponds to 100 nits to obtain a modulation factor mod used in the reconstruction process.

$$\text{mod} = \frac{D\_PL - SDR\_PL}{C\_PL - SDR\_PL}$$

In step 120, in order to provide the improved display adaptation, the first component of the decoded image $I_2$ may be adjusted according to the modulation factor mod. A linear modulation can be used as follows:

$$y_1 = y + \max(0, a \cdot \text{mod} \cdot u' + b \cdot \text{mod} \cdot v')$$

Other type of modulations could be used such as a gammatized modulation for example.

In step 121, a linear-light luminance component L of the image $I_3$ is obtained by inverse-mapping the first component $c_1$:

$$L = ITM(y_1)$$

In step 122, the second and third component U', V' of the image $I_3$ are derived by inverse correcting the second and third components u', v' of the output image $I_2$ according to the first component $y_1$.

According to an embodiment of step 122, the second and third components u' and v' are multiplied by a scaling function $\beta_0(y_1)$ whose value depends on the first component $y_1$.

Mathematically speaking, the two first and second components U', V' are given by:

$$\begin{bmatrix} U' \\ V' \end{bmatrix} = \beta_0(y_1) \cdot \begin{bmatrix} u' \\ v' \end{bmatrix}$$

In step 12, a scaling function $\beta_0(.)$ (so-called lutCC) is reconstructed (derived) from the obtained color-correction parameters (see for recommendation ETSI TS 103 433 V1.1.1 clause 7.2.3.2 more details). As specified in clause 6.2.6 of TS 103 433 v1.1.1, the lutCC derivation is using a saturation gain function sgf(1/L) corresponding to the color correction encoded at the HDR decomposition process and comprised in the set of parameters SP. The derivation is performed as follows:

lutCC(Y)=f(Y)·(1/Y) with f(Y)=1/(R·sgf(1/Y))

where R is a constant value equal to 2.

In order to provide the improved display adaptation, the lutCC derivation may be adjusted according to the modulation factor mod by using an updated f function:

f(Y)=1/(R·(sgf(1/Y)·mod+(1−mod)/R)

so that the resulting modulated value equals 1 when D_PL=SDR_PL (display is SDR), unchanged when D_PL=C_PL (display adapted to content) and between 1 and the unchanged value when SDR_PL<D_PL<C_PL and thus requires adaptation.

In step 12, the inverse mapping function ITM (so-called lutMapY) is reconstructed (derived) from the obtained mapping parameters (see recommendation ETSI TS 103 433 V1.1.1 clause 7.2.3.1 for more details).

The lutMapY derivation comprises an "Apply gamma function". In order to provide the improved display adaptation this gamma function is modulated by the modulation factor as follows:

γ=2.0+0.4·(1−mod)

This ensures that the resulting gamma modulated value equals:
- 2.4 when presentation display peak luminance (D_PL) =100 nits (SDR_PL)
- 2.0 when presentation display peak luminance (D_PL) =Content or mastering peak luminance (C_PL)
- is modulated between 2.4 and 2.0 when SDR_PL<D_PL<C_PL.

In step 122, a combined compression correction is performed. A parameter T is first computed as:

T=k0×U'×V'+k1×U.'.×U'+k2×V'×V'

Then S, U and V parameters are computed as follow depending on T value.

If (T<1) S=√(1−T),U=U',V=V' else S=0,U=U'/√T,V=V'/√T

The first case corresponds to the normal case. The second is in principle not possible, but may happen because of quantization and compression.

In order to provide the improved display adaptation the k0, k1 and k2 parameters are modulated by the modulation factor so that the T value becomes T=k0×mod×U'×V'+k1×mod×U'×U'+k2×mod×V'×V'

Finally, the step 26 comprises a gamma correction. In order to provide the improved display adaptation the gamma function is modified as follows:

γ=2.0+0.4·(1−mod)

The result of this modulation is that the resulting gamma is 2.4 for SDR displays, 2.0 when presentation display peak luminance is the same as the content peak luminance, and is adapted between 2.0 and 2.4 otherwise.

Figure 4:
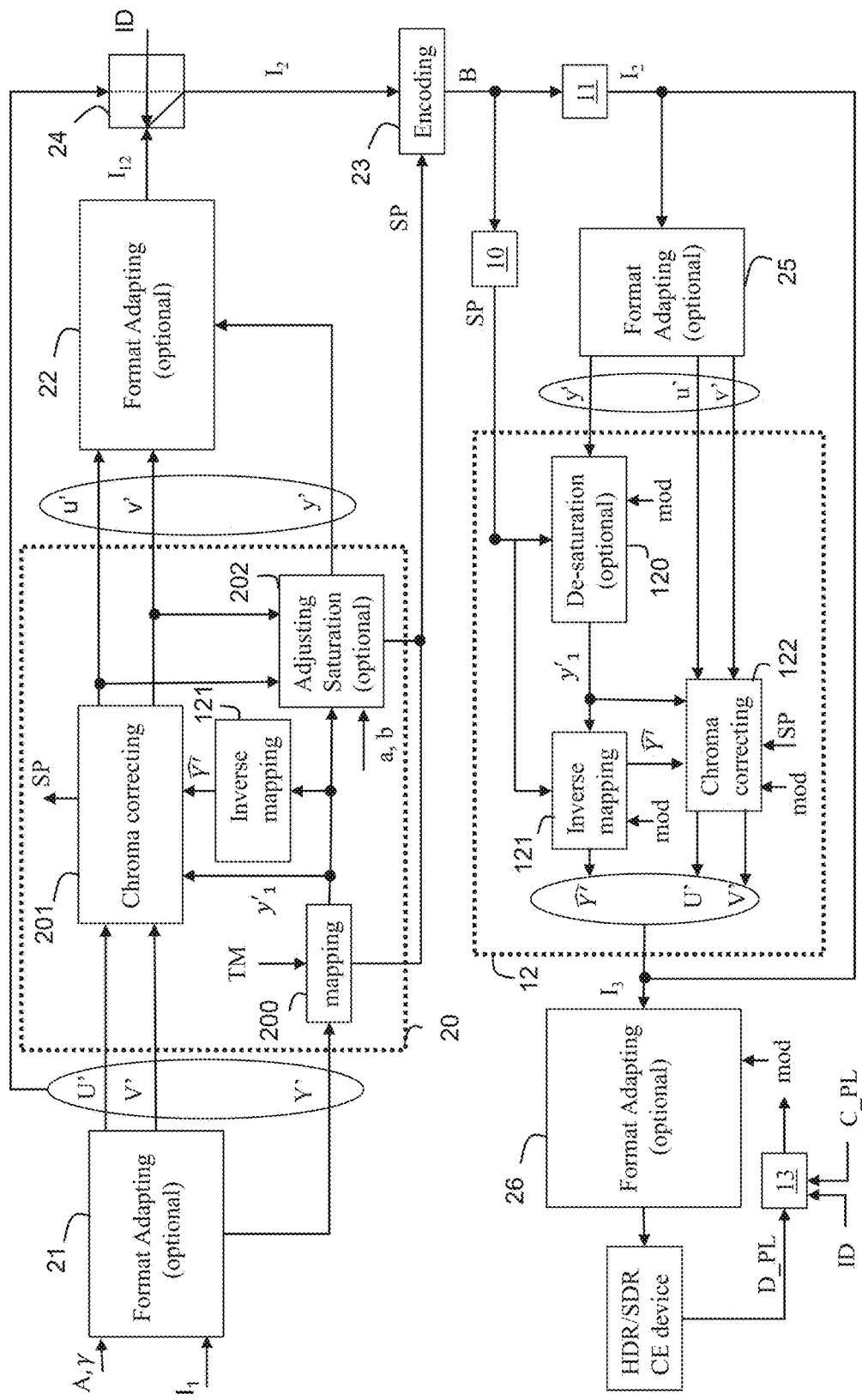
FIG. 4 shows an exemplary embodiment of an end-to-end workflow of FIG. 2 comprising an improved display adaptation function in accordance with another embodiment of the present principles.

According to a second exemplary embodiment of the method of FIG. 2, as illustrated in FIG. 4 at the pre-processing part, further comprising an improved display adaptation function, the first component C1 of the original image $I_1$ is a component Y' obtained from the gamma-compressed RGB components of the original image $I_1$ by:

$$Y' = A_1 \begin{bmatrix} R' \\ G' \\ B' \end{bmatrix}$$

and the second and third component U', V' by applying a gammatization to the RGB components of the original image $I_1$:

$$\begin{bmatrix} U' \\ V' \end{bmatrix} = \begin{bmatrix} A_2 \\ A_3 \end{bmatrix} \begin{bmatrix} R' \\ G' \\ B' \end{bmatrix} \times 1024$$

where γ may be a gamma factor, preferably equal to 2.4.

Note, the component Y', which is a non-linear signal, is different of the linear-light luminance component L.

In step 200, the first component $y'_1$ of the output image $I_{12}$ is obtained by mapping said component Y':

$y'_1$=TM(Y')

In step 121, a reconstructed component $\hat{Y}'$ is obtained by inverse-mapping the first component $y'_1$:

$\hat{Y}'$=ITM($y'_1$)

where ITM is the inverse of the mapping function TM.

The values of the reconstructed component $\hat{Y}'$ belong thus to the dynamic range of the values of the component Y'.

In step 201, the second and third component u', v' of the output image $I_{12}$ are derived by correcting the first and second components U', V' according to the first component $y'_1$ and the reconstructed component $\hat{Y}'$.

This step 201 allows to control the colors of the output image $I_{12}$ and guarantees their matching to the colors of the original image $I_1$.

The correction of the chroma components may be maintain under control by tuning the parameters of the mapping (inverse mapping). The color saturation and hue are thus under control. Such a control is not possible, usually, when a non-parametric perceptual transfer function is used.

According to an embodiment of step 201, the second and third components u' and v' are divided by a scaling function $\beta_0(y'_1)$ whose value depends on the ratio of the reconstructed component $\hat{Y}'$ over the component $y'_1$:

$$\beta_0(y'_1) = \frac{ITM(y'_1) \cdot \Omega}{y'_1} = \frac{\hat{Y}' \cdot \Omega}{y'_1}$$

with Ω is constant value depending on the color primaries of the original image $I_1$ (equals to 1.3 for BT.2020 for example).

At the decoding side, in step 13, the presentation display peak luminance (D_PL) parameter is obtained from the display device on which the output image is displayed. The content or mastering peak luminance (C_PL) parameters is obtained from the decoded image or from the set of parameters SP. These parameters are combined with a SDR presentation display peak luminance (SDR_PL), that typically corresponds to 100 nits to obtain a modulation factor mod used in the reconstruction process defined as follows:

$$\text{mod} = \frac{D\_PL - SDR\_PL}{C\_PL - SDR\_PL}$$

In step 120, in order to provide the improved display adaptation, the first component of the decoded image $I_2$ may be adjusted according to the modulation factor mod. A linear modulation can be used as follows:

$$y_1 = y + \max(0, a \cdot \text{mod} \cdot u' + b \cdot \text{mod} \cdot v')$$

Other type of modulations could be used such as a gammatized modulation for example.

At the post-processing part, in step 121, a component Y' of the image $I_3$ is obtained by inverse-mapping the first component $y'_1$:

$$\hat{Y}' = ITM(y'_1)$$

In step 122, the second and third component U', V' of the image $I_3$ are derived by inverse correcting the second and third components u', v' of the decoded image $I_2$ according to the first component $y'_1$ and the component Y'.

According to an embodiment of step 122, a second and third components u' and v' are multiplied by the scaling function $\beta_0(y'_1)$.

Mathematically speaking, the two first and second components U', V' are given by:

$$\begin{bmatrix} U' \\ V' \end{bmatrix} = \beta_0(y_1) \cdot \begin{bmatrix} u' \\ v' \end{bmatrix}$$

The mapping function TM of FIGS. 2, 3 and 4 is based on a perceptual transfer function, whose goal is to convert a component of an original image $I_1$ into a component of an output image $I_{12}$, thus reducing (or increasing) the dynamic range of the values of their luminance. The values of a component of an output image $I_{12}$ belong thus to a lower (or greater) dynamic range than the values of the component of an original image $I_1$.

Said perceptual transfer function uses a limited set of control parameters.

Figure 5A:
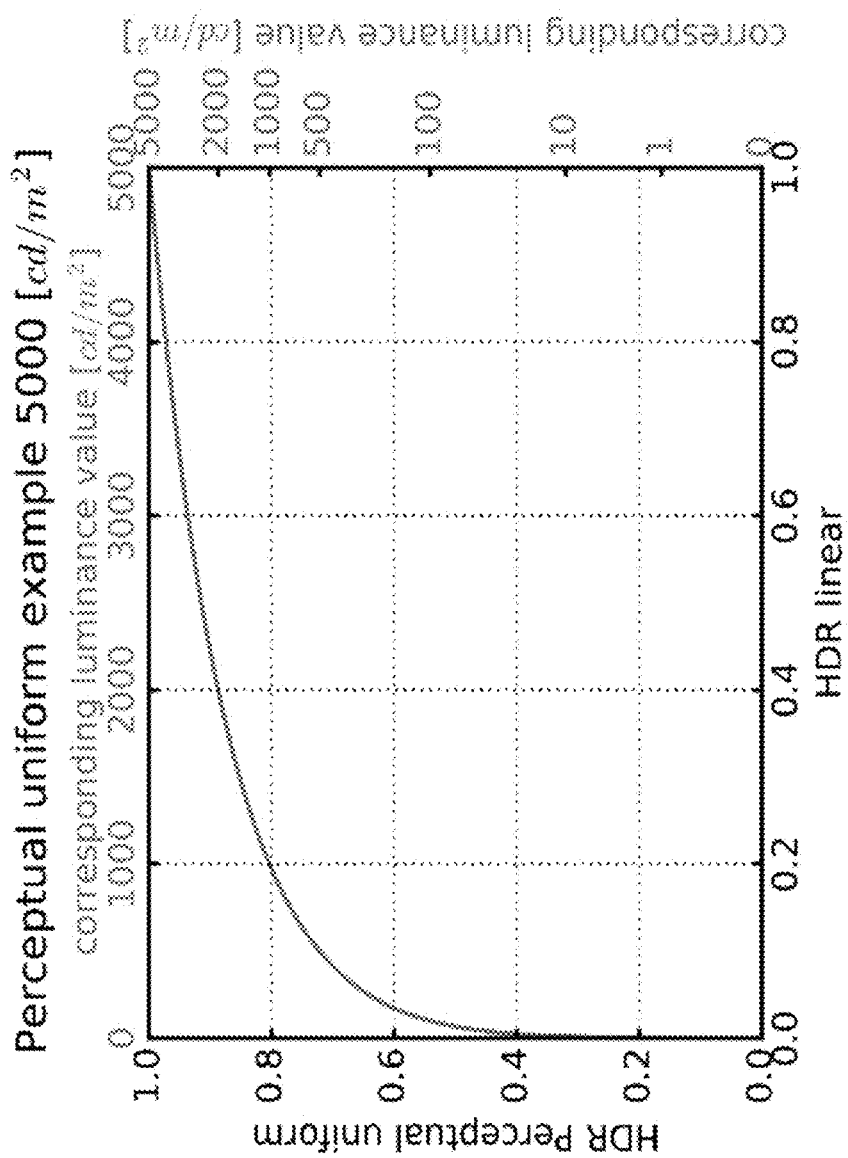
FIG. 5a shows an illustration of a perceptual transfer function.

FIG. 5a shows an illustration of a perceptual transfer function which may be used for mapping luminance components but a similar perceptual transfer function for mapping luma components may be used.

Figure 5B:
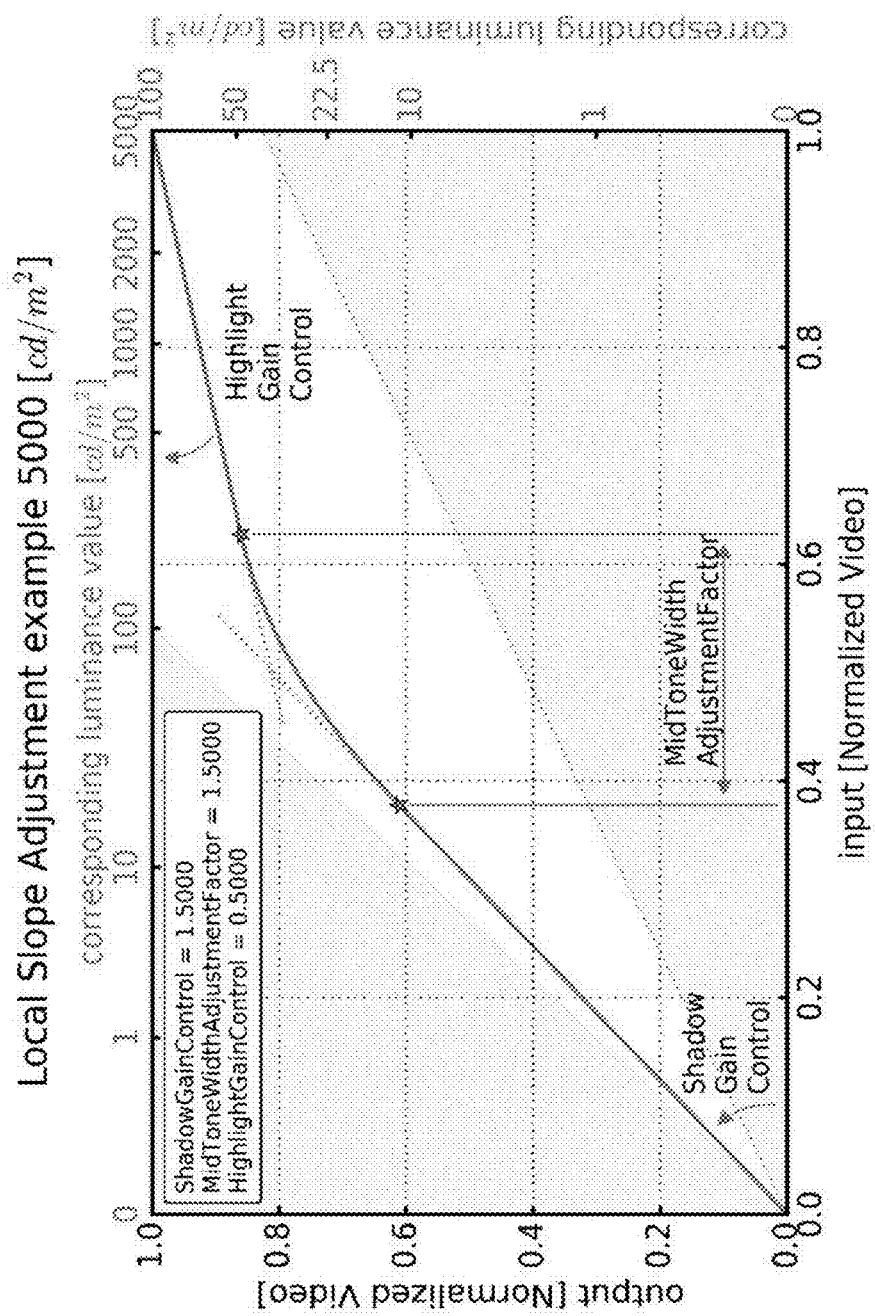
FIG. 5b shows an example of a piece-wise curve used for mapping.

The mapping is controlled by a mastering display peak luminance parameter (equal to 5000 cd/m² in FIG. 5a). To better control the black and white levels, a signal stretching between content-dependent black and white levels is applied. Then the converted signal is mapped using a piece-wise curve constructed out of three parts, as illustrated in FIG. 5b. The lower and upper sections are linear, the steepness being determined by the shadowGain and highlightGain parameters respectively. The mid-section is a parabola providing a smooth bridge between the two linear sections. The width of the cross-over is determined by the midToneWidthAdjFactor parameter.

All the parameters controlling the mapping may be conveyed as metadata for example by using a SEI message as defined in JCTVC-W0133 to carry the SMPTE ST 2094-20 metadata.

Figure 5C:
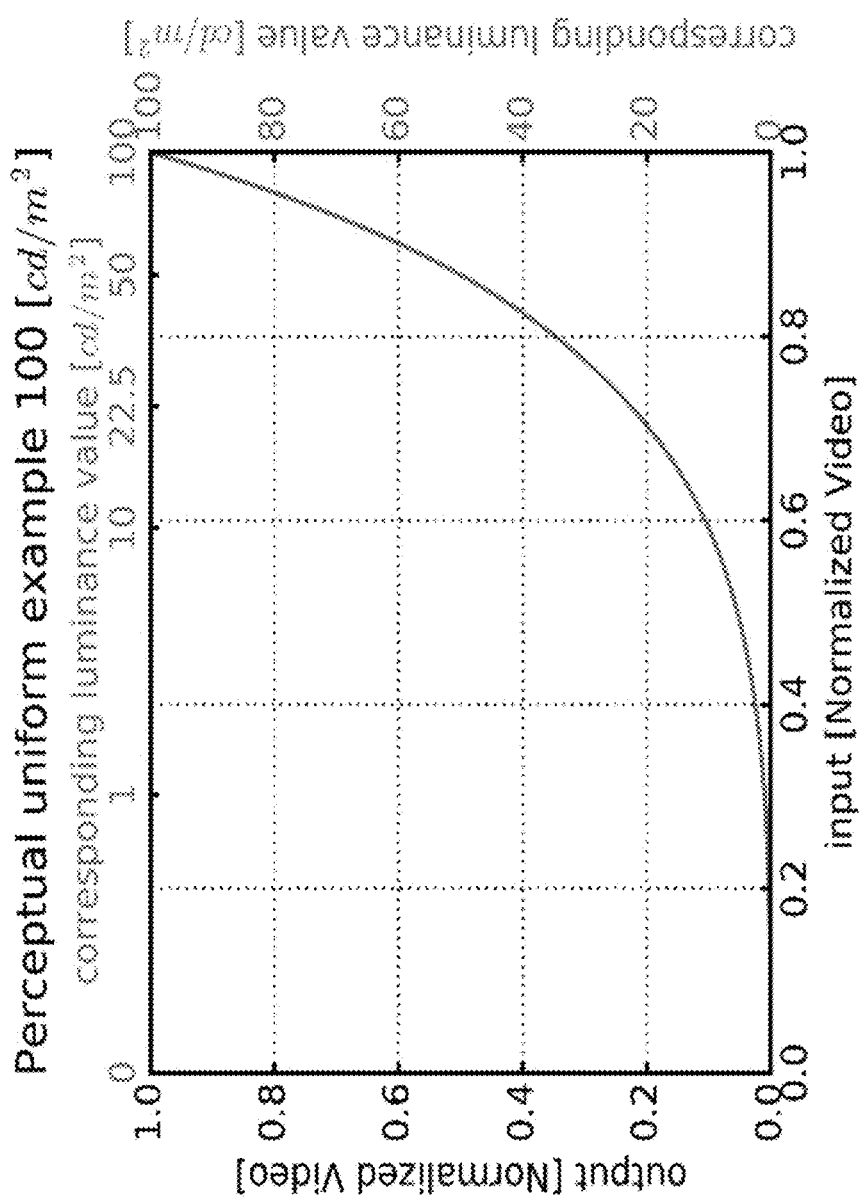
FIG. 5c shows an example of a curve used for converting back a signal to a linear light domain.

FIG. 5c shows an example of the inverse of the perceptual transfer function TM (FIG. 5a) to illustrate how a perceptual optimized video signal may be converted back to the linear light domain based on a targeted legacy display maximum luminance, for example 100 cd/m².

In step 10 (FIG. 1), the set of parameters SP is obtained to reconstruct an image $I_3$ from a decoded image $\hat{I}_2$.

These parameters may be obtained from metadata obtained from a bitstream, for example the bitstream B.

The recommendation ETSI TS 103 433 V1.1.1 clause 6, 2016-08 provides an example of syntax of said metadata.

The syntax of the recommendation ETSI TS 103 433 v1.1.1 is described for reconstructing an HDR video from an SDR video but this syntax may extend to the reconstruction of any image $I_3$ from any decoded image $\hat{I}_2$.

The post-processing (step 12) operates on an inverse mapping function ITM and a scaling function $\beta_0(.)$ that are derived from dynamic metadata because they depend on the first component $c_1$.

According to the recommendation ETSI TS 103 433 V1.1.1, said dynamic metadata may be conveyed according to either a so-called parameter-based mode or a table-based mode.

The parameter-based mode may be of interest for distribution workflows which primary goal is to provide direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams.

In the parameter-based mode, dynamic metadata to be conveyed are luminance mapping parameters representative of the inverse function ITM, i.e.

tmInputSignalBlackLevelOffset;
tmInputSignalWhiteLevelOffset;
shadowGain;
highlightGain;
midToneWidthAdjFactor;
tmOutputFineTuning parameters;

Moreover, other dynamic metadata to be conveyed are color correction parameters (saturationGainNumVal, saturationGainX(i) and saturationGainY(i)) used to define the function $\beta_0(.)$ (ETSI recommendation ETSI TS 103 433 V1.1.1 clauses 6.3.5 and 6.3.6).

Note the parameters a and b may be respectively carried/hidden in the saturationGain function parameters as explained above.

These dynamic metadata may be conveyed using the HEVC Colour Volume Reconstruction Information (CVRI) user data registered SEI message whose syntax is based on the SMPTE ST 2094-20 specification (recommendation ETSI TS 103 433 V1.1.1 Annex A.3).

Typical dynamic metadata payload is about 25 bytes per scene.

In step 101, the CVRI SEI message is parsed the SEI message to obtain mapping parameters and color-correction parameters.

In step 12, the inverse mapping function ITM (so-called lutMapY) is reconstructed (derived) from the obtained mapping parameters (see recommendation ETSI TS 103 433 V1.1.1 clause 7.2.3.1 for more details).

In step 12, the scaling function $\beta_0(.)$ (so-called lutCC) is also reconstructed (derived) from the obtained color-correction parameters (see recommendation ETSI TS 103 433 V1.1.1 clause 7.2.3.2 for more details).

The lutCC derivation is using a function sgf(1/L) corresponding to the color correction encoded at the HDR decomposition process and comprised in the set of parameters SP. The derivation is performed as follows:

$$\text{lutCC}(Y)=f(Y)\cdot(1/Y) \text{ with } f(Y)=1/(R \cdot sgf(1/Y))$$

In order to provide the improved display adaptation, the lutCC derivation may be adjusted according to the modulation factor mod by using an updated f function:

$$f(Y)=1/(R \cdot (sgf(1/Y) \cdot \text{mod} + (1-\text{mod})/R)$$

so that the resulting modulated value equals 1 when D_PL=SDR_PL (display is SDR), unchanged when D_PL=C_PL (display adapted to content) and between 1 and the unchanged value otherwise.

In the table-based mode, dynamic data to be conveyed are pivots points of a piece-wise linear curve representative of the inverse mapping function ITM. For example, the dynamic metadata are luminanceMappingNumVal that indicates the number of the pivot points, luminanceMappingX that indicates the x values of the pivot points, and luminanceMappingY that indicates the y values of the pivot points (see recommendation ETSI TS 103 433 V1.1.1 clauses 6.2.7 and 6.3.7 for more details).

Moreover, other dynamic metadata to be conveyed may be pivots points of a piece-wise linear curve representative of the scaling function $\beta_0(.)$. For example, the dynamic metadata are colorCorrectionNumVal that indicates the number of pivot points, colorCorrectionX that indicates the x values of pivot points, and colorCorrectionY that indicates the y values of the pivot points (see the recommendation ETSI TS 103 433 V1.1.1 clauses 6.2.8 and 6.3.8 for more details).

These dynamic metadata may be conveyed using the HEVC Colour Remapping Information (CRI) SEI message whose syntax is based on the SMPTE ST 2094-30 specification (recommendation ETSI TS 103 433 V1.1.1 Annex A.4).

Typical payload is about 160 bytes per scene.

In step 102, the CRI (Colour Remapping Information) SEI message (as specified in HEVC/H.265 version published in December 2016) is parsed to obtain the pivot points of a piece-wise linear curve representative of the inverse mapping function ITM and the pivot points of a piece-wise linear curve representative of the scaling function $\beta_0(.)$, and the chroma to luma injection parameters a and b.

In step 12, the inverse mapping function ITM is derived from those of pivot points relative to a piece-wise linear curve representative of the inverse mapping function ITM (see recommendation ETSI TS 103 433 V1.1.1 clause 7.2.3.3 for more details).

In step 12, the scaling function $\beta_0(.)$, is also derived from those of said pivot points relative to a piece-wise linear curve representative of the scaling function $\beta_0(.)$, (see recommendation ETSI TS 103 433 V1.1.1 clause 7.2.3.4 for more details).

Note that static metadata also used by the post-processing stage may be conveyed by SEI message. For example, the selection of either the parameter-based mode or table-based mode may be carried by the Information (TSI) user data registered SEI message (payloadMode) as defined by the recommendation ETSI TS 103 433 V1.1.1 (clause A.2.2). Static metadata such as, for example, the color primaries or the maximum display mastering display luminance are conveyed by a Mastering Display Colour Volume (MDCV) SEI message as defined in AVC, HEVC.

According to an embodiment of step 103, the information data ID is explicitly signaled by a syntax element in a bitstream and thus obtained by parsing the bitstream.

For example, said syntax element is a part of a SEI message.

According to an embodiment, said information data ID identifies what is the processing applied to the original image $I_1$ to process the set of parameters SP.

According to this embodiment, the information data ID may then be used to deduce how to use the parameters to reconstruct the image $I_3$ (step 12).

For example, when equal to 1, the information data ID indicates that the set of parameters SP has been obtained by applying the pre-processing stage (step 20) to an original HDR image $I_1$ and that the decoded image $I_2$ is a SDR image.

When equal to 2, the information data ID indicates that the parameters have been obtained by applying the pre-processing stage (step 20) to an HDR10 bits image (input of step 20), that the decoded image $\hat{I}_2$ is a HDR10 image, and the mapping function TM is a PQ transfer function.

When equal to 3, the information data ID indicates that the parameters have been obtained by applying the pre-processing stage (step 20) to a HDR10 image (input of step 20), that the decoded image $\hat{I}_2$ is an HLG10 image, and the mapping function TM is a HLG transfer function to the original image $I_1$.

According to another embodiment where the information data ID is equal to 2, the value of modulation factor is:

$$\text{mod} = 1 - \frac{invPQ(\text{D\_PL}) - invPQ(\text{SDR\_PL})}{invPQ(\text{D\_PL}) - invPQ(\text{SDR\_PL})}$$

where invPQ(C) is the inverse of the PQ EOTF as specified by equations 5.1 and 5.2 of ST-2084. In this embodiment, the compression correction uses modified parameters k0=k1=k2=0, the desaturation is modified uses modified parameters a=b=0.

According to another embodiment where the information data ID is equal to 3, the value of modulation factor is:

$$\text{mod} = 1 - \frac{invHLG(\text{D\_PL}) - invHLG(\text{SDR\_PL})}{invHLG(\text{D\_PL}) - invHLG(\text{SDR\_PL})}$$

where invHLG(C) is the inverse of the HLG EOTF function defined in § E.3.1, Table E-4, p. 378—Rec. ITU-T H.265 v4 (03/2017 or equivalently ARIB STD-B67. In this embodiment, the compression correction uses modified parameters k0=k1=k2=0, the desaturation is modified uses modified parameters a=b=0.

According to an embodiment of step 103, the information data ID is implicitly signaled.

For example, the syntax element transfer-characteristics present in the VUI of HEVC (annex E) or AVC (annex E) usually identifies a transfer function (mapping function TM) to be used. Because different single layer distribution solutions use different transfer function (PQ, HLG, . . . ), the syntax element transfer-characteristics may be used to identify implicitly the recovery mode to be used.

The information data ID may also be implicitly signaled by a service defined at a higher transport or system layer.

In accordance with another example, a peak luminance value and the color space of the image $I_3$ may be obtained by parsing the MDCV SEI message carried by the bitstream, and the information data ID may be deduced from specific combinations of peak luminance values and color spaces (color primaries).

On FIG. 1-4, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

FIG. 6 represents an exemplary architecture of a device 60 which may be configured to implement a method described in relation with FIG. 1-4. Device 60 comprises following elements that are linked together by a data and address bus 61:

a microprocessor 62 (or CPU), which is, for example, a DSP (or Digital Signal Processor);
a ROM (or Read Only Memory) 63;
a RAM (or Random Access Memory) 64;
an I/O interface 65 for reception of data to transmit, from an application; and
a battery 66

In accordance with an example, the battery 66 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with present principles. When switched on, the CPU 62 uploads the program in the RAM 64 and executes the corresponding instructions.

RAM 64 comprises, in a register, the program executed by the CPU 62 and uploaded after switch on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example, the input video or an original image of an input video is obtained from a source. For example, the source belongs to a set comprising:

a local memory (63 or 64), e.g. a video memory or a RAM (or Random Access Memory), a flash memory, a ROM (or Read Only Memory), a hard disk;
a storage interface (65), e.g. an interface with a mass storage, a RAM, a flash memory, a ROM, an optical disc or a magnetic support;
a communication interface (65), e.g. a wireline interface (for example a bus interface, a wide area network interface, a local area network interface) or a wireless interface (such as a IEEE 802.11 interface or a Bluetooth® interface); and
an image capturing circuit (e.g. a sensor such as, for example, a CCD (or Charge-Coupled Device) or CMOS (or Complementary Metal-Oxide-Semiconductor)).

In accordance with examples, the bitstreams carrying on the metadata are sent to a destination. As an example, one of these bitstream or both are stored in a local or remote memory, e.g. a video memory or a RAM (64), a hard disk. In a variant, at least one of the bitstreams is sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

In accordance with other examples, the bitstream carrying on the metadata is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, device 60 being configured to implement the method as described above, belongs to a set comprising:

a mobile device;
a communication device;
a game device;
a tablet (or tablet computer);
a laptop;
a still image camera;
a video camera;
an encoding/decoding chip;
TV set;
a set-top-box;
a display;
a still image server; and
a video server (e.g. a broadcast server, a video-on-demand server or a web server).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for reconstructing image data ($I_3$) representative of original image data ($I_1$) from decoded image data ($I_2$) and parameters obtained from a bitstream, wherein the reconstructed image is adapted to a characteristic of a presentation display, the method comprising:

desaturating a luma component according to parameters for adjusting the desaturation;

inverse-mapping said desaturated luma component to obtain a reconstructed luma component;

correcting two chroma components to obtain two reconstructed chroma components according to said desaturated luma component and said reconstructed luma component;

characterized in that the chroma correction is responsive to the value of a single modulation factor mod representative of:

a luminance information data (D_PL) of the presentation display;

a luminance information data (SDR_PL) of a typical Standard-Dynamic-Range image; and a luminance information data (C_PL) of the original image data ($I_1$) or the mastering display used to grade the original image data, and wherein the value of the modulation factor mod is computed according to following formula:

$$\mathrm{mod} = \frac{\mathrm{D\_PL} - \mathrm{SDR\_PL}}{\mathrm{C\_PL} - \mathrm{SDR\_PL}}$$

2. The method of claim 1 wherein the value of SDR_PL is 100 nits.

3. The method of claim 1 wherein the desaturating operation further comprises obtaining (31) a desatured luma component $y'_1$ as follows:

$$y'_1 = y' + \mathrm{Max}(0, a \times \mathrm{mod} \times u' + b \times \mathrm{mod} \times v')$$

where a and b are two control parameters for adjusting the desaturation, y' is the luma component and u' v' are the chroma components.

4. The method of claim 1 wherein the inverse-mapping is using a look-up table constructed using a gamma function modulated by the modulation factor according to following formula:

$$y = 2.0 + 0.4 \times (1 - \mathrm{mod}).$$

5. The method of claim 1 wherein the chroma correcting operation uses a look-up table lutCC defining the correction to apply to the chroma components for a given luma component, the look-up table lutCC being derivated based on a saturation gain function sgf( ) whose impact is modulated by the modulation factor as follows:

$$\mathrm{lutCC}(Y) = f(Y) \cdot (1/Y) \text{ with } f(Y) = 1/(R \cdot (sgf(1/Y) \cdot \mathrm{mod} + (1-\mathrm{mod})/R)$$

with R being a constant value equal to 2.

6. The method of claim 1 wherein the chroma correcting operation comprises:

computing a parameter T based on parameters k0, k1, and k2 obtained from a set of parameters SP, the parameter T being responsive to a value of the single modulation factor mod as follows:

$$T=k0\times U'\times V'+k1\times U'\times U'\times U'+k2\times V'\times V'$$

wherein when the parameter T is smaller than 1, computing the combined compression correction as follows:

$$S=\sqrt{(1-T)}, U=U' \text{ and } V=V'; \text{ and}$$

wherein when the parameter T is greater than or equal to 1, computing the combined compression correction as follows:

$$S=0, U=U'/\sqrt{T}, V=V'/\sqrt{T}.$$

7. A device for reconstructing image data ($I_3$) representative of original image data ($I_1$) from decoded image data ($I_2$) and parameters obtained from a bitstream, said parameters having been processed from said original image data ($I_1$), wherein the reconstructed image is adapted to a characteristic of a presentation display, the device comprising a processor configured to:
   desaturate a luma component according to parameters for adjusting the desaturation;
   perform an inverse-mapping said desaturated luma component to obtain a reconstructed luma component;
   correct two chroma components to obtain two reconstructed chroma components according to said desaturated luma component and said reconstructed luma component;
   characterized in that the chroma correction is responsive to the value of a single modulation factor mod representative of:
   a luminance information data (D_PL) of the presentation display;
   a luminance information data (SDR_PL) of a typical Standard-Dynamic-Range image; and
   a luminance information data (C_PL) of the original image data ($I_1$) or the mastering display used to grade the original image data
wherein the value of the modulation factor is computed according to following formula:

$$\text{mod} = \frac{D\_PL - SDR\_PL}{C\_PL - SDR\_PL}$$

8. The device of claim 7 wherein the value of SDR_PL is 100 nits.

9. The device of claim 7 wherein the desaturating operation further comprises obtaining (31) a desatured luma component $y'_1$ as follows:

$$y'_1 = y' + \text{Max}(0, a\times \text{mod}\times u' + b\times \text{mod}\times v')$$

where a and b are two control parameters for adjusting the desaturation, y' is the luma component and u' v' are the chroma components.

10. The device of claim 7 wherein the inverse-mapping is using a look-up table constructed using a gamma function modulated by the modulation factor according to following formula:

$$y=2.0+0.4\times(1-\text{mod}).$$

11. The device of claim 7 wherein the chroma correcting operation uses a look-up table lutCC defining the correction to apply to the chroma components for a given luma component, the look-up table lutCC being derivated based on a saturation gain function sgf( ) whose impact is modulated by the modulation factor as follows:

$$\text{lutCC}(Y)=f(Y)\cdot(1/Y) \text{ with } f(Y)=1/(R\cdot(sgf(1/Y)\cdot\text{mod}+(1-\text{mod})R)$$

with R being a constant value equal to 2.

12. The device of claim 7 wherein the chroma correcting operation comprises:
   computing a parameter T based on parameters k0, k1, and k2 obtained from a set of parameters SP, the parameter T being responsive to a value of the single modulation factor mod as follows:

$$T=k0\times U'\times V'+k1\times U'\times U'+k2\times V'\times V'$$

wherein when the parameter T is smaller than 1, computing the combined compression correction as follows:

$$S=\sqrt{(1-T)}, U=U' \text{ and } V=V'; \text{ and}$$

wherein when the parameter T is greater than or equal to 1, computing the combined compression correction as follows:

$$S=0, U=U'/\sqrt{T}, V=V'/\sqrt{T}.$$

13. The method of claim 5 wherein the desaturating operation further comprises obtaining (31) a desatured luma component $y'_1$ as follows:

$$y'_1 = y' + \text{Max}(0, a\times \text{mod}\times u' + b\times \text{mod}\times v')$$

where a and b are two control parameters for adjusting the desaturation, y' is the luma component and u' v' are the chroma components.

14. The method of claim 2 wherein the inverse-mapping is using a look-up table constructed using a gamma function modulated by the modulation factor according to following formula:

$$\square=2.0+0.4\times(1-\text{mod}).$$

15. The method of claim 2 wherein the chroma correcting operation uses a look-up table lutCC defining the correction to apply to the chroma components for a given luma component, the look-up table lutCC being derivated based on a saturation gain function sgf( ) whose impact is modulated by the modulation factor as follows:

$$\text{lutCC}(Y)=f(Y)\cdot(1/Y) \text{ with } f(Y)=1/(R\cdot(sgf(1/Y)\cdot\text{mod}+(1-\text{mod})/R)$$

with R being a constant value equal to 2.

16. The method of claim 2 wherein the chroma correcting operation comprises:
   computing a parameter T based on parameters k0, k1, and k2 obtained from a set of parameters SP, the parameter T being responsive to a value of the single modulation factor mod as follows:

$$T=k0\times U'\times V'+k1\times U'\times U'+k2\times V'\times V'$$

wherein when the parameter T is smaller than 1, computing the combined compression correction as follows:

$$S=\sqrt{(1-T)}, U=U' \text{ and } V=V'; \text{ and}$$

wherein when the parameter T is greater than or equal to 1, computing the combined compression correction as follows:

$$S=0, U=U'/\sqrt{T}, V=V'/\sqrt{T}.$$

17. The device of claim 8 wherein the desaturating operation further comprises obtaining (31) a desatured luma component $y'_1$ as follows:

$$y'_1 = y' + \text{Max}(0, a\times \text{mod}\times u' + b\times \text{mod}\times v')$$

where a and b are two control parameters for adjusting the desaturation, y' is the luma component and u' v' are the chroma components.

18. The device of claim 8 wherein the inverse-mapping is using a look-up table constructed using a gamma function modulated by the modulation factor according to following formula:

$$\square = 2{,}0 + 0{,}4 \times (1 - \text{mod}).$$

19. The device of claim 8 wherein the chroma correcting operation uses a look-up table lutCC defining the correction to apply to the chroma components for a given luma component, the look-up table lutCC being derivated based on a saturation gain function sgf( ) whose impact is modulated by the modulation factor as follows:

$$\text{lutCC}(Y) = f(Y) \cdot (1/Y) \text{ with } f(Y) = 1/(R \cdot (sgf(1/Y) \cdot \text{mod} + (1-\text{mod})/R)$$

with R being a constant value equal to 2.

20. The device of claim 8 wherein the chroma correcting operation comprises:

computing a parameter T based on parameters k0, k1, and k2 obtained from a set of parameters SP, the parameter T being responsive to a value of the single modulation factor mod as follows:

$$T = k0 \times U' \times V' + k1 \times U' \times U' + k2 \times V' \times V'$$

wherein when the parameter T is smaller than 1, computing the combined compression correction as follows:

$$S = \sqrt{(1-T)},\ U = U' \text{ and } V = V';\text{ and}$$

wherein when the parameter T is greater than or equal to 1, computing the combined compression correction as follows:

$$S = 0,\ U = U'/\sqrt{T},\ V = V'/\sqrt{T}.$$

21. A non-transitory processor-readable medium storing program code instructions to execute the steps of the method according to any of claim 2, 13, 14, 15 when the program code instructions are executed on a computer.

22. A non-transitory processor-readable medium storing program code instructions to execute the steps of the method according to claim 2 when the program code instructions are executed on a computer.

23. A non-transitory processor-readable medium storing program code instructions to execute the steps of the method according to claim 13 when the program code instructions are executed on a computer.

24. A non-transitory processor-readable medium storing program code instructions to execute the steps of the method according to claim 14 when the program code instructions are executed on a computer.

25. A non-transitory processor-readable medium storing program code instructions to execute the steps of the method according to claim 15 when the program code instructions are executed on a computer.

* * * * *

UNITED STATES PATENT AND TRADEMARK OFFICE
CERTIFICATE OF CORRECTION

PATENT NO. : 10,600,163 B2
APPLICATION NO. : 15/821245
DATED : March 24, 2020
INVENTOR(S) : Yannick Olivier et al.

It is certified that error appears in the above-identified patent and that said Letters Patent is hereby corrected as shown below:

In the Claims

In Claim 4, Column 22, Line 51, replace the "y" with the --γ--.

In Claim 10, Column 23, Line 59, replace the "y" with the --γ--.

In Claim 13, Column 24, Line 19, replace "claim 5" with --claim 2--.

In Claim 14, Column 24, Line 31, replace "□=2,0+4,0×(1-mod)" with --γ=2.0+4.0×(1-mod)--.

In Claim 18, Column 25, Line 5, replace "□=2,0+4,0×(1-mod)" with --γ=2.0+4.0×(1-mod)--.

In Claim 21, Column 26, Line 8, replace "any of claim 2, 13, 14, 15" with --claim 1--.

Signed and Sealed this
Fifth Day of July, 2022

Katherine Kelly Vidal
*Director of the United States Patent and Trademark Office*